(12) United States Patent
Takamoto

(10) Patent No.: US 9,524,130 B2
(45) Date of Patent: Dec. 20, 2016

(54) CONTROL DEVICE, CONTROL METHOD OF A CONTROL DEVICE, AND STORAGE MEDIUM TO GENERATE AND OUTPUT A CONTROL COMMAND COMPATIBLE WITH A SECOND PRINTING DEVICE THAT DIFFERS STRUCTURALLY FROM THE FIRST PRINTING DEVICE

(71) Applicant: Seiko Epson Corporation, Tokyo (JP)

(72) Inventor: Akio Takamoto, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 14/310,361

(22) Filed: Jun. 20, 2014

(65) Prior Publication Data

US 2014/0376031 A1 Dec. 25, 2014

(30) Foreign Application Priority Data

Jun. 20, 2013 (JP) .................................. 2013-129474

(51) Int. Cl.
*G06K 15/00* (2006.01)
*G06F 3/12* (2006.01)

(52) U.S. Cl.
CPC ............ *G06F 3/1225* (2013.01); *G06F 3/1209* (2013.01); *G06F 3/1229* (2013.01); *G06F 3/1284* (2013.01)

(58) Field of Classification Search
CPC ............. G06F 3/12; G06F 1/10; G06F 3/1293
See application file for complete search history.

(56) References Cited

U.S. PATENT DOCUMENTS

| 2005/0141013 A1* | 6/2005 | Kikuchi | G06F 3/1204 358/1.14 |
| 2006/0092462 A1* | 5/2006 | Mokuya | G06F 3/124 358/1.15 |
| 2009/0066996 A1* | 3/2009 | Minowa | B41J 3/54 358/1.15 |
| 2009/0303534 A1* | 12/2009 | Gotoh | G03G 15/5075 358/1.15 |

(Continued)

FOREIGN PATENT DOCUMENTS

| JP | 10-224533 A | 8/1998 |
| JP | 2011-118597 A | 6/2011 |
| JP | 2012-058810 A | 3/2012 |

*Primary Examiner* — Barbara Reinier
*Assistant Examiner* — Henok A Shiferaw
(74) *Attorney, Agent, or Firm* — Nutter McClennen & Fish LLP

(57) ABSTRACT

A control device suppresses modifying a program related to printer control when a connected printer is replaced with a printer having a different structure. A host computer has a print controller that can execute processes based on status data; a virtual second printing device that outputs response data when a control command output from the print controller is input; and a data processing unit that converts the input control command to a control command compatible with an inkjet printer and outputs to the inkjet printer when a control command output from the print controller is input, and when status data from the inkjet printer is input, converts the status data to data compatible with a thermal printer based on the structural differences between the inkjet printer and the thermal printer, and outputs to the print controller.

8 Claims, 6 Drawing Sheets

(56) References Cited

U.S. PATENT DOCUMENTS

| | | | | |
|---|---|---|---|---|
| 2011/0013223 A1* | 1/2011 | Nishimura | ............ | G06F 3/1203 358/1.15 |
| 2011/0242585 A1* | 10/2011 | Inoue | .................... | G06F 3/1204 358/1.15 |
| 2012/0057184 A1* | 3/2012 | Furuhata | ............... | G06F 3/1205 358/1.13 |
| 2013/0314727 A1 | 11/2013 | Furuhata et al. | | |

* cited by examiner

CONTROL DEVICE, CONTROL METHOD OF A CONTROL DEVICE, AND STORAGE MEDIUM TO GENERATE AND OUTPUT A CONTROL COMMAND COMPATIBLE WITH A SECOND PRINTING DEVICE THAT DIFFERS STRUCTURALLY FROM THE FIRST PRINTING DEVICE

Priority is claimed under 35 U.S.C. §119 to Japanese Application nos. 2013-129474 filed on June 20, which is hereby incorporated by reference in their entirety.

BACKGROUND

1. Technical Field

The present invention relates to a control device connected to a printer, a control method of the control device, and a storage medium storing a program for controlling the control device.

2. Related Art

Systems having a control device (print control device) and a connected printing device (printer) configured so that the printer sends status data (status information) to the control device are known from the literature. See, for example, JP-A-2011-118597.

In systems such as this having a control device that controls a printer, an application and printer driver are typically installed in the control device, and the control device controls the printer using functions of these programs.

The printer connected to the control device in the above system could conceivably be replaced by a different type or model of printer. The likelihood that the format of the status data will also change due to the structural differences between the old printer that is replaced and the new printer is high. For example, if the original printer that is replaced is a thermal printer, and the new printer is a color printer, the status data output by the original printer will not include status data related to ink. In this event, replacing the printer becomes easier and user convenience improves if the printer can be replaced while minimizing modification of the control programs (such as the application and printer driver in the above example) to accommodate differences in the format of the status data resulting from differences in the printers.

SUMMARY

The present invention minimizes modifications to the printer control program that are needed when replacing a printer connected to a control device with a printer of a different construction.

A control device according to the invention is a control device that connects to a first printing device, and has: a print controller that can generate and output a control command compatible with a second printing device that differs structurally from the first printing device, and execute a process based on status data for the second printing device; a virtual second printing device that outputs response data for the second printing device to the print controller when a control command output from the print controller is input; and a data processing unit that converts the input control command to a control command compatible with the first printing device and outputs to the first printing device when a control command output from the print controller is input, and when status data from the connected first printing device is input, converts the status data to data compatible with the second printing device based on the structural differences between the first printing device and the second printing device, and outputs to the print controller.

When a control command for the second printing device is output by the print controller in this configuration, the response to the control command is sent to the print controller by a function of the virtual second printing device. That is, the print controller does not output control commands compatible with the first printing device, and can continue executing processes in the same way as when the second printing device is connected. Therefore, when the connected printer is changed from a second printer to a first printer, there is no need to modify the program that renders the control command generating and outputting functions of the print controller so that the print controller outputs control commands compatible with the first printer.

When status data is input from the connected first printing device in this configuration, the data processing unit converts the input status data according to the structural differences between the first printing device and the second printing device to status data compatible with the second printing device, and outputs to the print controller. More specifically, status data based on the structural differences between the first printing device and the second printing device is output from the data processing unit to the print controller. As a result, even if the printer connected to the control device changes from the second printing device to the first printing device, the print controller only needs to be able to receive status data compatible with the second printing device and execute processes based on the data, and there is no need to modify the program that renders the print controller function to be compatible with status data for the first printing device. Modification of the program related to printer control can therefore be suppressed when replacing a printer connected to the control device with a printer of a different configuration.

Preferably, when status data is input from the first printing device, the data processing unit determines if there is compatible status data, which is status data for the second printing device with content of the same identity as the input status data, and if there is compatible status data, converts the input status data to compatible status data and outputs to the print controller.

Even when the configurations of the printers differ, both printers may be able to output status data with the same content. For example, if both printers have a cover, both printers may be able to send status data indicating that the cover is open.

When status data is input from the first printing device and there is compatible status data, the data processing unit in this configuration converts the input status data to the compatible status data and outputs to the print controller, and can therefore accurately communicate status data for the first printing device to the print controller.

Further preferably, when the result of determining if compatible status data is present is that there is no compatible status data, and the input status data is error report data indicating an error occurred that requires stopping control command output by the print controller, the data processing unit outputs to the print controller data stopping control command output, and reports the error content.

This configuration enables stopping output of control commands and reporting the content of an error to the user when an error has occurred that requires stopping control command output by the print controller, even when there is no compatible status data corresponding to the status data input from the first printing device.

Further preferably, when the result of determining if there is compatible status data is that there is no compatible status data, and the input status data is not error report data, the data processing unit reports the content of the status indicated by the input status data.

This configuration enables informing the user of the status reported by the status data so that a corresponding operation can be performed even when there is no compatible status data corresponding to the status data input from the first printing device.

In another aspect of the invention, the print controller can execute a process based on status flag data, which is status data compatible with the second printing device and represents a status by the state of a flag; and the data processing unit monitors if there was a change in a status of the first printing device based on the status data input from the connected first printing device, and when there is a status change, outputs the status flag data to the print controller with the flag for the status that changed set.

This configuration enables using status flag data to accurately report a change in device status to the print controller when there is a change in the status of the first printing device.

Another aspect of the invention is a control method of a control device connected to a first printing device, the control method controlling a control device including a print controller that can generate and output a control command compatible with a second printing device that differs structurally from the first printing device, and execute a process based on status data for the second printing device, and a virtual second printing device that outputs response data for the second printing device to the print controller when a control command output from the print controller is input, and the control method including: a data processing step that converts the input control command to a control command compatible with the first printing device and outputs to the first printing device when a control command output from the print controller is input, and when status data from the connected first printing device is input, converts the status data to data compatible with the second printing device based on the structural differences between the first printing device and the second printing device, and outputs to the print controller.

When a control command for the second printing device is output by the print controller in this configuration, a function of the virtual second printing device responds appropriately, and there is therefore no need to modify the program related to the control command generating and outputting functions of the print controller 31.

When status data is input from the first printing device in this configuration, data is appropriately converted and output to the print controller by a function of the data processing unit, and there is therefore no need to modify the program related to status data processing by the print controller. The program that renders the function of the print controller therefore does not need to be modified as a result of replacing a printer, and device replacement is simplified.

Another aspect of the invention is a storage medium storing a program that can be executed by a control unit that controls a control device connected to a first printing device, the program causing the control unit to function as: a print controller that can generate and output a control command compatible with a second printing device that differs structurally from the first printing device, and execute a process based on status data for the second printing device; a virtual second printing device that outputs response data for the second printing device to the print controller when a control command output from the print controller is input; and a data processing unit that converts the input control command to a control command compatible with the first printing device and outputs to the first printing device when a control command output from the print controller is input, and when status data from the connected first printing device is input, converts the status data to data compatible with the second printing device based on the structural differences between the first printing device and the second printing device, and outputs to the print controller.

When a control command for the second printing device is output by the print controller in this configuration, a function of the virtual second printing device responds appropriately, and there is therefore no need to modify the program related to the control command generating and outputting functions of the print controller.

When status data is input from the first printing device in this configuration, data is appropriately converted and output to the print controller by a function of the data processing unit, and there is therefore no need to modify the program related to status data processing by the print controller. The program that renders the function of the print controller therefore does not need to be modified as a result of replacing a printer, and device replacement is simplified.

Effect of the Invention

When replacing a printer connected to a control device with a printer having a different configuration, the invention suppresses modification of the program related to control by the control device.

Other objects and attainments together with a fuller understanding of the invention will become apparent and appreciated by referring to the following description and claims taken in conjunction with the accompanying drawings.

DESCRIPTION OF EMBODIMENTS

Preferred embodiments of the present invention are described below with reference to the accompanying figures.

Embodiment 1

Figure 1:
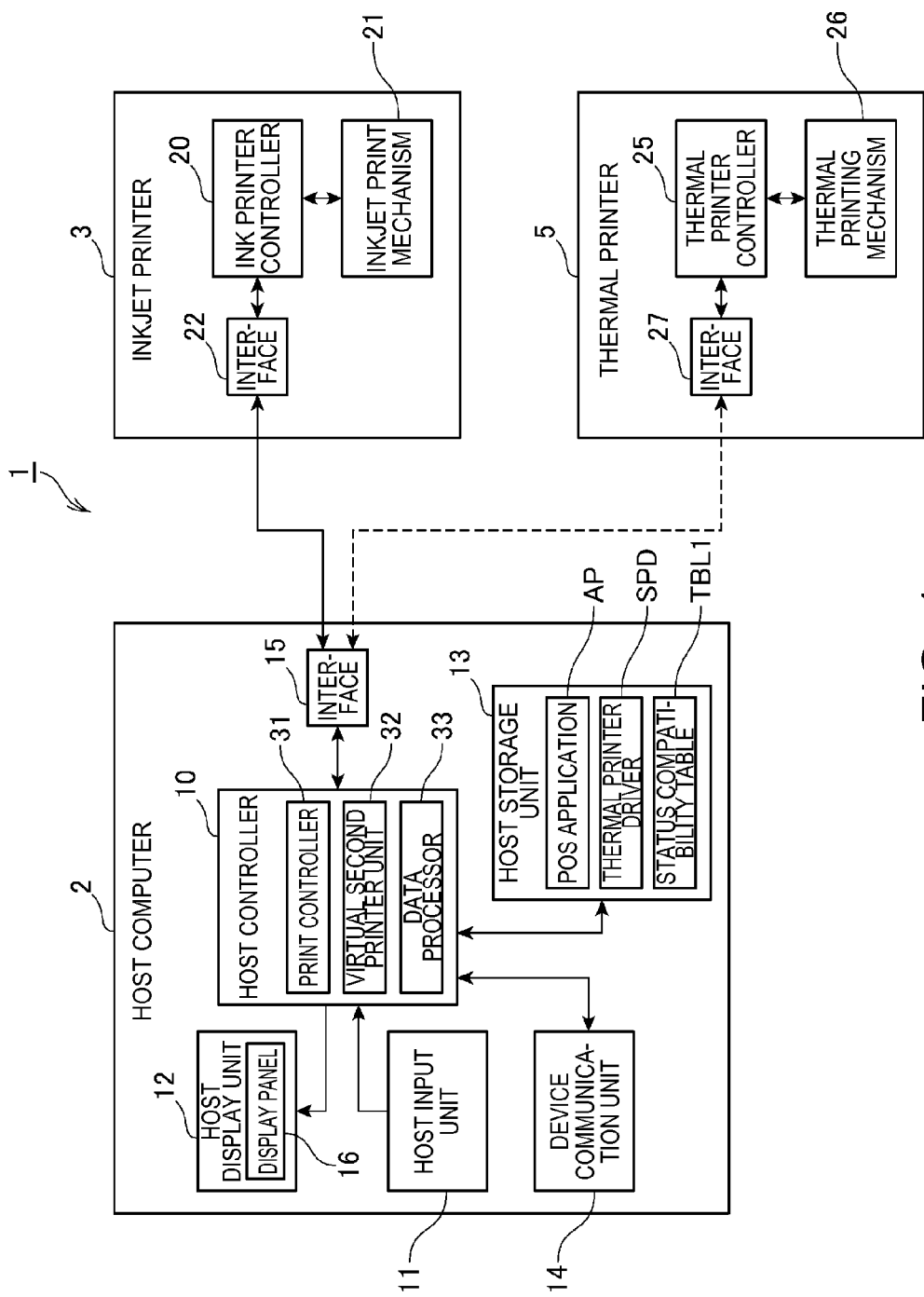
FIG. 1 is a block diagram showing the functional configuration of a control system according to a preferred embodiment of the invention.

FIG. 1 is a function block diagram illustrating the configuration of a control system 1 according to this embodiment of the invention.

As shown in FIG. 1, the control system 1 includes a host computer 2 (control device) and an inkjet printer 3 (first printer) that is connected to the host computer 2 and prints images on recording media as controlled by the host computer 2.

The control system 1 is deployed in a store such as a supermarket or convenience store, and is part of a POS system. There are multiple checkout counters in a store in which a POS system using this control system 1 is deployed. The control system 1 is installed at each checkout counter. The control system 1 has a function for producing receipts based on a transaction conducted at the checkout counter.

The inkjet printer 3 is an inkjet printer capable of color printing. A thermal printer 5 (second printer, also referred as the "old printer" below) was connected to the host computer 2 before the inkjet printer 3 (also referred to as the "new printer") is connected. This thermal printer 5 is a thermal printer capable of gray scale printing.

The new inkjet printer 3 and the old thermal printer 5 have different configurations (structures).

One object of the control system 1 according to this embodiment is to minimize the software modifications required on the host computer 2 that are needed when the thermal printer 5 is replaced with the inkjet printer 3, and thereby simplify printer replacement and improve user convenience.

The host computer 2 is a device that functions as a so-called POS terminal, and as shown in FIG. 1 has a host control unit 10 (control unit), host input unit 11, host display unit 12, host storage unit 13, device communication unit 14, and interface 15.

The host controller 10 includes a CPU, ROM, RAM, and other peripheral circuits, and controls other parts of the host computer 2. The host controller 10 has a print controller 31, a virtual second printer unit 32, and a data processor 33.

The host input unit 11 is connected to a keyboard or other input device, detects input to the input device, and outputs to the host controller 10. The host display unit 12 has an LCD panel or other display panel 16, and displays data as controlled by the host controller 10.

The host storage unit 13 is a hard disk drive, EEPROM, or other memory device, and nonvolatilely stores data rewritably. A POS application AP and a thermal printer driver SPD are installed to the host computer 2. The POS application AP has a function for generating and outputting data including the information required to produce a receipt ("print data" below) to the thermal printer driver SPD in order to produce a receipt. The thermal printer driver SPD is a printer driver for controlling the thermal printer 5. The thermal printer driver SPD has a function for generating and outputting control commands conforming to the command language of the thermal printer 5 based on print data input from the POS application AP.

The device communication unit 14 connects to devices such as a barcode reader that reads barcodes on products and packaging, a card reader that read information recorded on cards such as member cards, and a cash register that stores bills and change. The device communication unit 14 communicates with these other devices as controlled by the host controller 10.

The interface 15 has a communication port TP as described below, and communicates with the inkjet printer 3 according to a specific communication protocol as controlled by the host controller 10.

While not shown in FIG. 1, the host computer 2 can communicate with a POS server through a LAN, the Internet, or other network. The POS server stores product master and customer master databases, and manages the POS system. To produce a receipt, the host computer 2 accesses the POS server as needed to acquire necessary information such as product names, product prices, and customer-related information.

As also shown in FIG. 1, the inkjet printer 3 has an ink printer controller 20, an inkjet print mechanism 21, and an interface 22.

The ink printer controller 20 has a CPU, ROM, RAM, and other peripheral circuits, and controls other parts of the inkjet printer 3. The inkjet print mechanism 21 includes an inkjet head, a carriage that moves the head, a recording media conveyance mechanism, and a cutter mechanism that cuts the recording medium. The inkjet head is capable of color printing and gets ink supplied from a plurality of color ink cartridges. The interface 22 communicates with the host computer 2 according to a specific communication protocol as controlled by the ink printer controller 20.

As described above, the thermal printer 5 is the printer that was connected to the host computer 2 before the printer connected to the host computer 2 is replaced with the inkjet printer 3 in this example.

As shown in FIG. 1, the thermal printer 5 has a thermal printer controller 25, a thermal printing mechanism 26, and an interface 27.

The thermal printer controller 25 includes a CPU, ROM, RAM, and other peripheral circuits, and controls other parts of the thermal printer 5. The thermal printing mechanism 26 includes a thermal printhead, a recording media conveyance mechanism, and a cutter mechanism that cuts the recording medium. The interface 27 communicates with the host computer 2 according to a specific communication protocol as controlled by the thermal printer controller 25.

As described above, the printer connected to the host computer 2 is changed from the thermal printer 5 to the inkjet printer 3, but due to the configuration of the invention described below, the host computer 2 according to this embodiment does not need modifying the POS application AP and the thermal printer driver SPD when replacing the printer, and thereby makes printer replacement easy as further described below.

Figure 2:
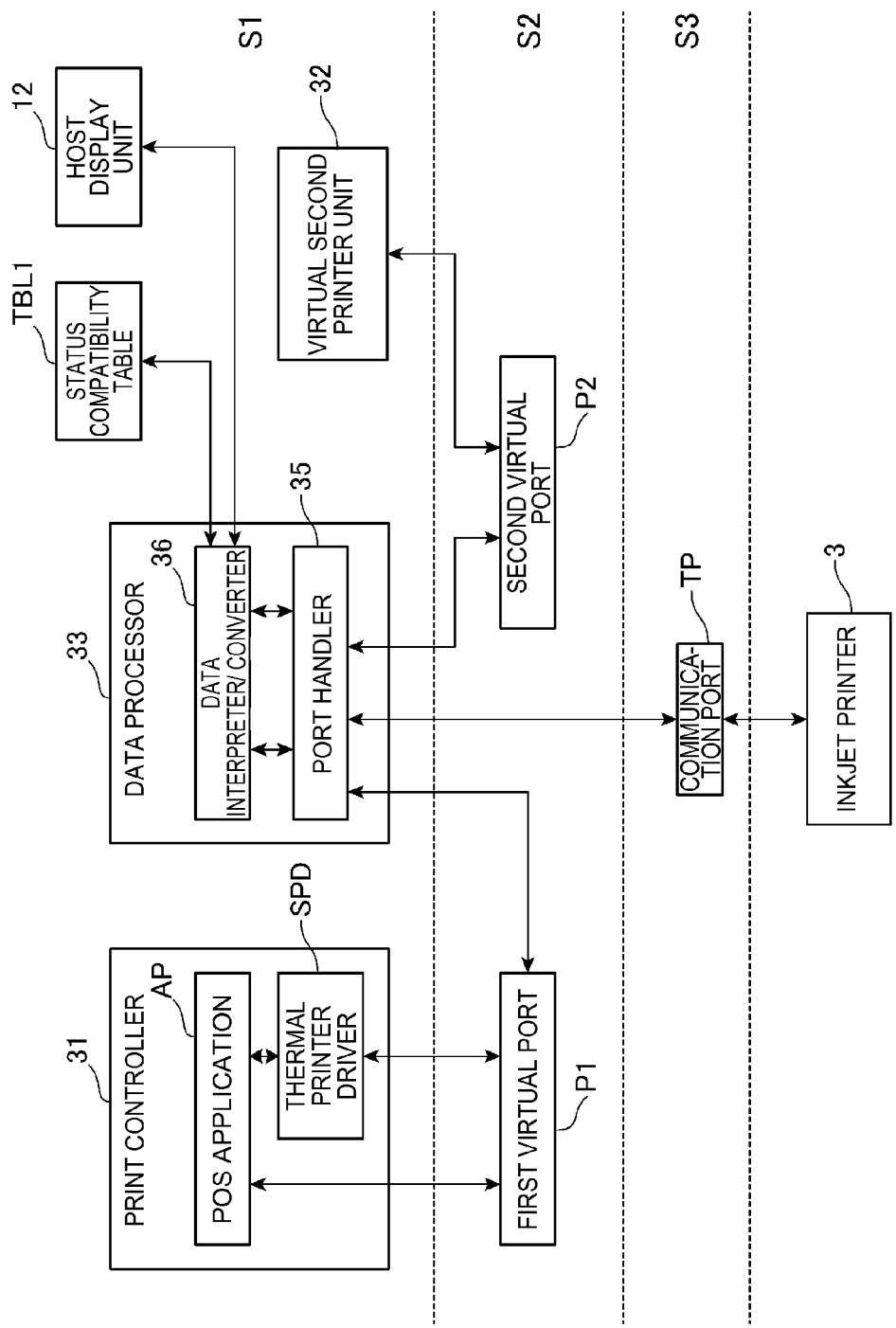
FIG. 2 is a block diagram showing the functional configuration of the host computer in detail.

FIG. 2 illustrates the functional configuration of the host computer 2 in detail.

For convenience of description, all function blocks, programs, software (logical) ports, and physical devices are represented by equivalent blocks in FIG. 2.

Note, further, that the functions of the function blocks described below are achieved by the cooperation of hardware and software, such as a CPU reading and running a program.

The print controller 31 of the host controller 10 is a function block capable of generating and outputting control commands compatible with the thermal printer 5 (second printing device), and as further described below receives status data for the thermal printer 5 and can execute processes based on the input status data.

To produce a receipt, the print controller 31 generates and outputs print data as described above to the thermal printer driver SPD by a function of the POS application AP. In addition, the print controller 31 generates control commands conforming to the command language of the thermal printer 5 (control commands compatible with the second printing device) based on the print data by a function of the thermal printer driver SPD, and outputs to a first virtual port P1 that was opened as a software (logical) port.

Note that specific data is output directly to the first virtual port P1 after being generated by the POS application AP, and is input through the first virtual port P1 directly to the POS application AP.

Control commands output by the print controller 31 to the first virtual port P1 are passed to a port handler 35. More specifically, the print controller 31 outputs the generated control commands through the first virtual port P1 to the port handler 35.

The data processor 33 is a function block of the host controller 10, and as shown in FIG. 2 has functions including a port handler 35 and data interpreter/converter 36.

As described in further detail below, the data processor 33 is configured so that control commands output from the print controller 31 can be input thereto, and when a control command from the print controller 31 is input, converts the control command to a control command for the inkjet printer 3 and outputs to the inkjet printer 3. As also described in further detail below, the data processor 33 is configured to enable input of status data from the connected inkjet printer 3, and when status data from the inkjet printer 3 is input, converts the status data to data corresponding to the thermal printer 5 based on differences in the configurations of the inkjet printer 3 and thermal printer 5, and outputs to the print controller 31.

A purpose of the data processor 33 is to extend the functionality of the POS application AP and the thermal printer driver SPD. As will become clear below, the printer can be replaced in this embodiment without modifying the POS application AP and thermal printer driver SPD, and this is enabled by the cooperation of the data processor 33 and the virtual second printer unit 32 described below.

The functions of the port handler 35 include at least the following.

One function of the port handler 35 is to output data (such as the control command input through the first virtual port P1) input through the first virtual port P1, the second virtual port P2 (described below), or the communication port TP (described below) to the data interpreter/converter 36 (described below).

Another function of the port handler 35 is to output data input from the data interpreter/converter 36 to the first virtual port P1, the second virtual port P2 (described below), or the communication port TP (described below), and convert the data to be output to a data format compatible with the output port by a function of a port communication service (PCS).

A port communication service is a function that can be called from a program, including the thermal printer driver SPD, and converts data according to the standard (such as RS232C or USB) of the interface. The port communication service absorbs differences between interface standards, and eliminates the need for software modification of the POS application AP and thermal printer driver SPD due to differences between the standards used by the different interfaces.

The data interpreter/converter 36 is a function block with a function for interpreting data input from the port handler 35, and a function for executing processes such as described below, including data conversion, based on the result of interpreting data.

The function of the data interpreter/converter 36 is rendered by a program written using API functions provided by OPOS or UPOS. The data interpreter/converter 36 program can also be called as needed by the thermal printer driver SPD, which conforms to the same OPOS and UPOS standards.

As shown in FIG. 2, the port handler 35 can send and receive data through the communication port TP, which is a physical port. This communication port TP is, for example, a communication port conforming to the USB communication standard, and the inkjet printer 3 is connected to the communication port TP through a communication cable conforming to the compatible communication standard.

The port handler 35 can also input and output data through the second virtual port P2, which is opened as a software (logical) port. The virtual second printer unit 32 is connected to this second virtual port P2.

The virtual second printer unit 32 is configured so that control commands output from the print controller 31 can be input through the first virtual port P1, and when a control command is input, outputs response data compatible with the thermal printer 5 (response data compatible with the second printing device) to the print controller 31.

The virtual second printer unit 32 functions to emulate the thermal printer 5 in relation to the print controller 31, and respond appropriately to the print controller 31. As a result, the print controller 31 can continue executing processes in the same way as when the thermal printer 5 is connected. In other words, when controlling the inkjet printer 3 to execute a process, the print controller 31 executes the same process that is executed when the thermal printer 5 is connected. As a result, modifying the POS application AP and the thermal printer driver SPD, which are programs enabling the print controller 31 to function, is not necessary when replacing the printer.

Note that in a hierarchical operating system, the print controller 31, virtual second printer unit 32, and data processor 33 are on an application layer S1, the first virtual port P1 and second virtual port P2 are on the kernel layer S2, and the communication port TP is on a physical layer S3.

The basic operation of the print controller 31, virtual second printer unit 32, and data processor 33 when producing a receipt is described below.

Figure 3:
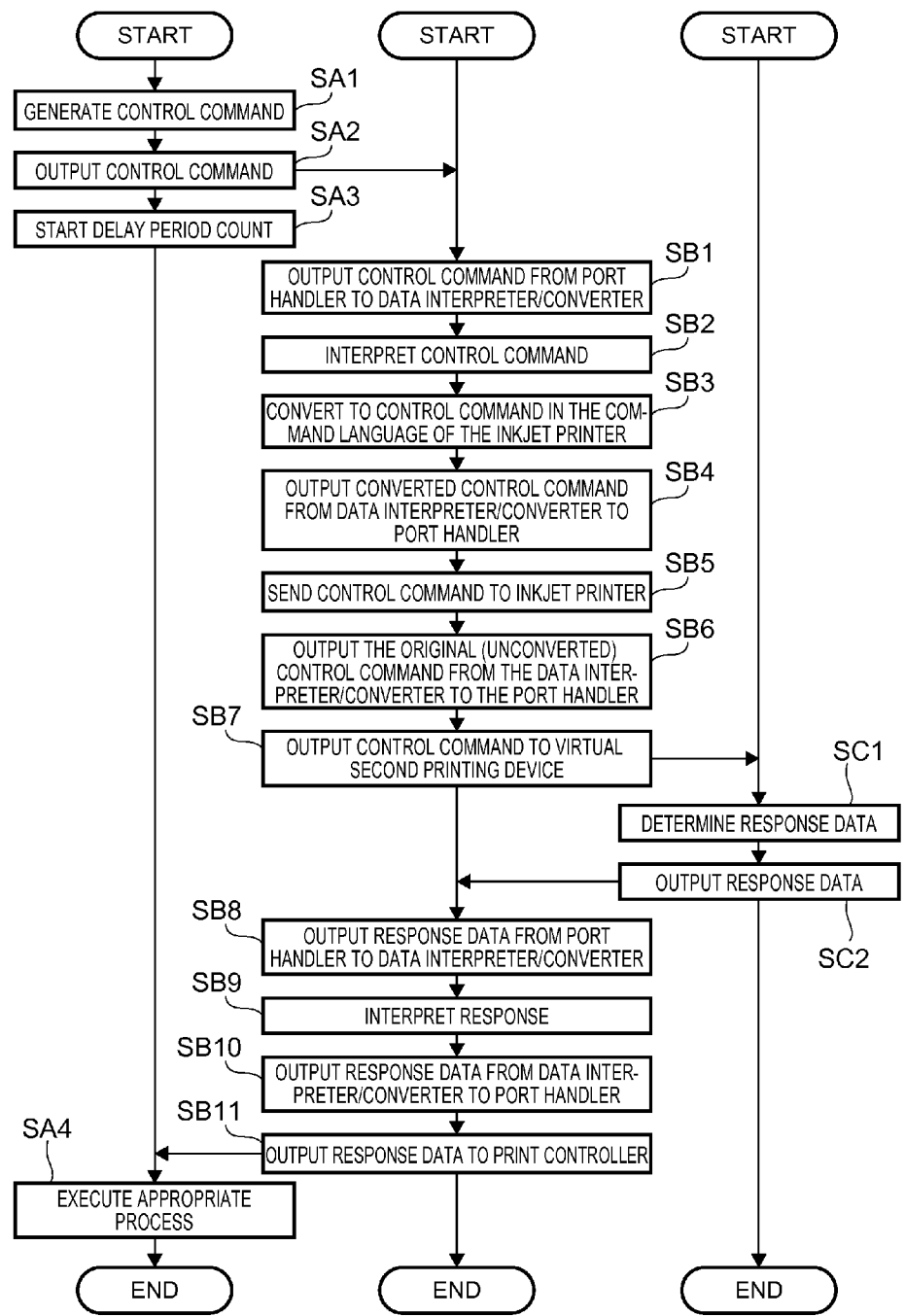
FIG. 3 is a flow chart showing the operation of the host computer.

FIG. 3 is a flow chart showing the operation of the function blocks when producing a receipt, column (A) describing the operation of the print controller 31, (B) the operation of the data processor 33, and (C) the operation of the virtual second printer unit 32.

The thermal printer driver SPD according to this embodiment waits for a specific period after generating and outputting a control command. If response data indicating that control command reception was completed is input during this delay period, the thermal printer driver SPD determines that receiving the control command was completed normally by the printer, and executes a predetermined process such as clearing the delay period count. If response data indicating that control command reception was completed is not input during this delay period, the thermal printer driver SPD determines that the control command was not received normally by the printer, reports an error by displaying an error message on the display panel 16, for example, and stops control command output until a user command is input.

In other words, in order for the print controller 31 to continue normal processing, specific response data must be returned during the delay period after the control command is output by the print controller 31.

Referring to FIG. 3, to produce a receipt, the print controller 31 generates a control command conforming to the command language of the thermal printer 5 (step SA1), and outputs through the first virtual port P1 to the port handler 35 of the data processor 33 (step SA2). The print controller 31 then starts the delay period count triggered by outputting a control command (step SA3).

The port handler 35 of the data processor 33 then outputs the input control command to the data interpreter/converter 36 (step SB1).

The data interpreter/converter 36 of the data processor 33 interprets the input control command, and recognizes that the control command is both a control command conforming to the command language of the thermal printer 5 and a control command instructing issuing a receipt (step SB2).

After thus recognizing the control command, the data interpreter/converter 36 executes the following process in order to issue a receipt with the inkjet printer 3. More specifically, the data interpreter/converter 36 converts the control command to a control command that conforms to the command language of the inkjet printer 3 and causes the inkjet printer 3 to execute the processes related to producing a receipt (a control command compatible with the first printing device) (step SB3). The program rendering the functions of the data interpreter/converter 36 includes a function for converting control commands according to predetermined rules. The converted control command in this example is a control command that can be executed by the inkjet printer 3 and instructing printing an image that has been appropriately colorized. After control command conversion, the data interpreter/converter 36 outputs information setting the communication port TP as the output port and the converted control command to the port handler 35 (step SB4).

The port handler 35 executes a data process appropriate to the specified communication port TP, and sends the converted control command through the communication port TP to the inkjet printer 3 (step SB5). The ink printer controller 20 of the inkjet printer 3 that received the converted control command then executes processes based on the control command, and produces a receipt.

Next, the data interpreter/converter 36 outputs the input control command, that is, the control command conforming to the command language of the thermal printer 5, with information setting the second virtual port P2 as the output port, to the port handler 35 (step SB6). The port handler 35 then executes a data process appropriate to the specified second virtual port P2 and outputs the control command through the second virtual port P2 to the virtual second printer unit 32 (step SB7).

When a control command is input, the virtual second printer unit 32 determines the response data to the control command (step SC1). In this example, a table relating the input control command to the response data to be output when the control command is input is stored in a specific storage area in the host storage unit 13. This table could be defined in the program that renders the functions of the virtual second printer unit 32. In step SC1, the virtual second printer unit 32 uses this table to determine the response data to the input control command.

The response data is data conforming to the command language of the thermal printer 5.

Next, the virtual second printer unit 32 outputs the response data identified in step SC1 through the second virtual port P2 to the port handler 35 (step SC2).

The port handler 35 outputs the input response data to the data interpreter/converter 36 (step SB8).

The data interpreter/converter 36 of the data processor 33 then interprets the input response data, and recognizes the control command as being response data conforming to the command language of the thermal printer 5 received in response to the control command instructing issuing a receipt (step SB9).

Next, after thus recognizing the control command, the data interpreter/converter 36 outputs the response data with information setting the first virtual port P1 as the output port to the port handler 35 in order to output the response data to the print controller 31 (step SB10).

The port handler 35 then executes a data process appropriate to the specified first virtual port P1, and outputs the response data through the first virtual port P1 to the print controller 31 (step SB11).

When response data is input, the print controller 31 executes the process that should be executed when the control command is received normally by the printer, such as clearing the delay period count, by a function of the thermal printer driver SPD (step SA4).

As described above, the print controller 31 outputs the control commands that were output to the thermal printer 5, which is the old printer that was replaced, to produce a receipt. More specifically, the program that renders the functions of the print controller 31 is not modified before or after the printer is replaced. Even though the print controller 31 outputs control commands for the thermal printer 5, receipts are printed and processes are completed normally by cooperation of the data processor 33 and virtual second printer unit 32.

If the old printer that is replaced is a thermal printer 5, and the new printer that replaced the thermal printer 5 is an inkjet printer 3, the configurations of the printers obviously differ.

The thermal printer 5 and the inkjet printer 3 each have a function for sending status data identifying the current status (state) of the printer at specific times. These specific times include, for example, when the status changes and when status data is requested by the host computer 2.

Status data is data containing information denoting the status in a specific format.

In this embodiment, the thermal printer 5 has a function that returns at least status data indicating if the loaded roll paper is near the end of the roll (a "thermal printer near-end state" below), and status data indicating that the end of the loaded roll paper has been reached (a "thermal printer no-paper state" below).

The inkjet printer 3 in this embodiment has a function that returns at least status data indicating if the loaded roll paper is near the end of the roll (an "inkjet printer near-end state" below), status data indicating that the end of the loaded roll paper has been reached (an "inkjet printer no-paper state" below), status data indicating that the ink is nearly depleted (a "near ink end state" below), and status data indicating that the ink is depleted (a "no-ink state" below). Note that for brevity the color of ink is not differentiated below.

Note that the thermal printer 5 does not have a function that sends ink-related status data, and differs in this respect from the inkjet printer 3.

In this example as described above, the status data returned by the old printer (thermal printer 5) and the new printer (inkjet printer 3) differ due to differences in the construction of each printer.

This embodiment of the invention can also handle differences in status data by means of a function of the data processor 33 without modifying the program that renders the functions of the print controller 31 before or after the printer is replaced as further described below.

Figure 4:
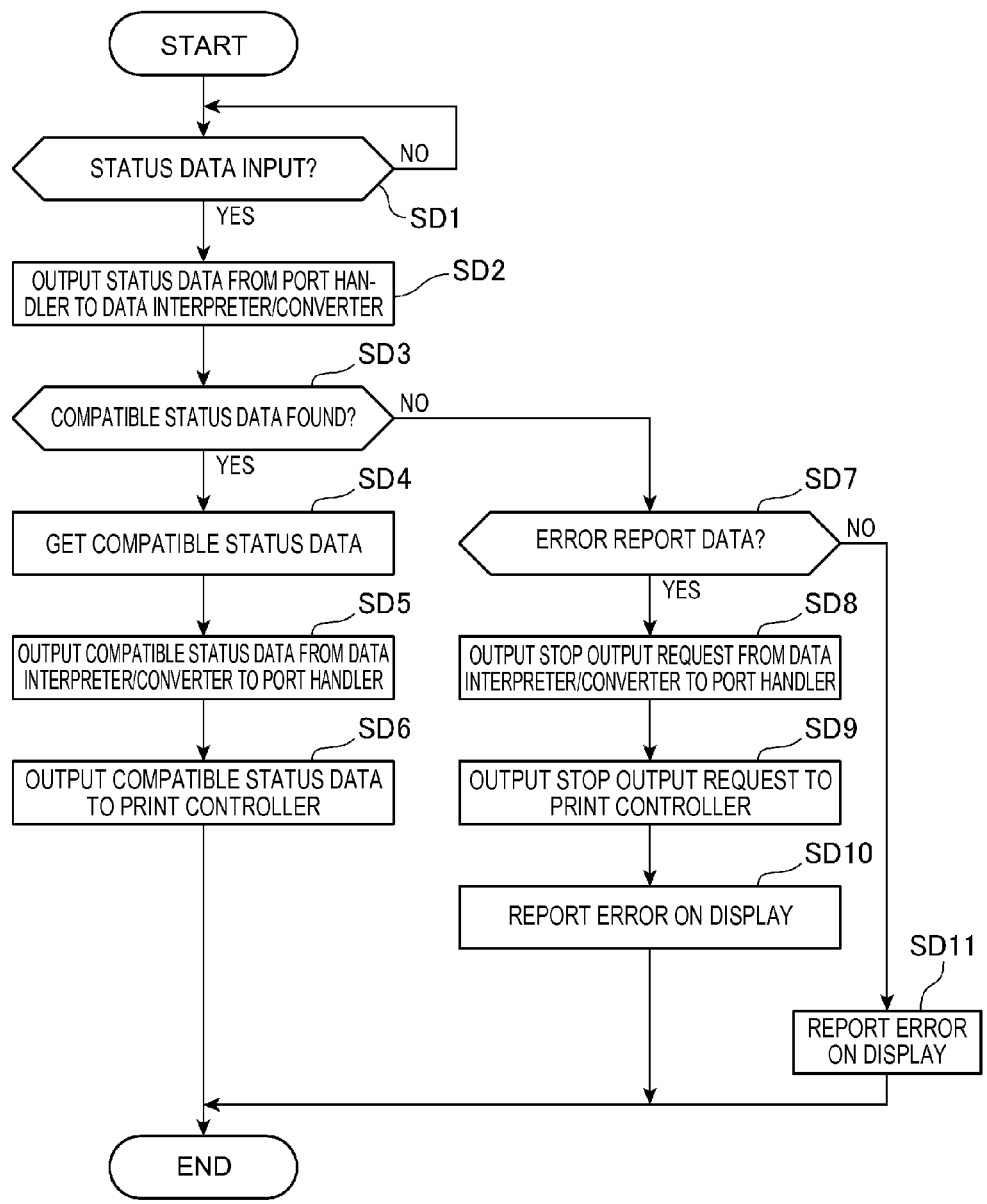
FIG. 4 is a flow chart showing the operation of the host computer.

FIG. 4 is a flow chart describing the operation related to processing status data by the print controller 31.

The port handler 35 checks if status data has been input from the inkjet printer 3 (step SD1).

If status data is input (step SD1 returns YES), the port handler 35 passes the input status data to the data interpreter/converter 36 (step SD2).

The data interpreter/converter 36 determines if there is compatible status data, which is status data compatible with the thermal printer 5, with identity to the input status data (step SD3). The operation of step SD3 is described below.

The thermal printer near-end state and the inkjet printer near-end state described above both indicate that the loaded paper roll is near the end, and therefore have the same identity. The content of the status data indicating the thermal printer near-end state, and the content of the status data indicating the inkjet printer near-end state, is therefore the same (has identity). Status data indicating the thermal printer near-end state is therefore compatible status data for the status data indicating the inkjet printer near-end state.

For the same reason, status data indicating the thermal printer no-paper state is status data compatible with the status data indicating the inkjet printer no-paper state.

Based thereon, the data interpreter/converter 36 determines there is compatible status data in step SD3 if the input status data is status data denoting the inkjet printer near-end state or status data denoting the inkjet printer no-paper state. This decision is made in this embodiment as described below.

More specifically, a status compatibility table TBL1 is also stored in the host storage unit 13. For status data sent by the inkjet printer 3 for which there is compatible status data, the status compatibility table TBL1 stores the status data relationally to the compatible status data. In this example, status data denoting the inkjet printer near-end state and status data denoting the thermal printer near-end state are relationally stored, and status data denoting the inkjet printer no-paper state and status data denoting the thermal printer no-paper state are relationally stored in the status compatibility table TBL1. This table could alternatively be defined programmatically. The data interpreter/converter 36 therefore references this table in step SD3, and determines if there is compatible status data for the input status data.

If it is determined in step SD3 that compatible status data is stored (step SD3 returns YES), the data interpreter/converter 36 references the status compatibility table TBL1 and acquires the compatible status data (step SD4). Next, the data interpreter/converter 36 outputs information setting the first virtual port P1 as the output port, and the compatible status data acquired in step SD4, to the port handler 35 (step SD5). After applying necessary data processing to the compatible status data, the port handler 35 outputs through the first virtual port P1 to the print controller 31 (step SD6).

When there is compatible status data for the status data input from the inkjet printer 3, the compatible status data is input to the print controller 31. The print controller 31 can then process status data compatible with the thermal printer 5 as described above. For example, in a configuration that displays an appropriate message on the display panel 16 when the thermal printer near-end state occurs in the thermal printer 5, the print controller 31 executes the same process when the inkjet printer near-end state occurs in the inkjet printer 3. In a configuration that displays an appropriate message on the display panel 16, stops outputting control commands to the thermal printer 5, and stops printer operation when the thermal printer no-paper state occurs in the thermal printer 5, the print controller 31 likewise executes the same processes when the inkjet printer no-paper state occurs in the inkjet printer 3.

If it is determined in step SD3 that compatible status data is not stored (step SD3 returns NO), the data interpreter/converter 36 analyzes the content of the input status data and determines if the status data is error report data (step SD7).

Error report data is status data reporting that an error that requires stopping operation of the inkjet printer 3 by means of the print controller 31 stopping control command output occurred. In this example, status data reporting a no-ink state is an example of this error report data.

Whether or not status data is error report data is predefined, and data including information identifying if specific status data is error report data is also stored in the host storage unit 13. In step SD7, the data interpreter/converter 36 references this data to identify error report data.

If the status data is error report data (step SD7 returns YES), the data interpreter/converter 36 outputs information setting the first virtual port P1 as the output port, and data stopping output of control commands ("stop-output data" below), to the port handler 35 (step SD8).

This stop-output data is data that the old thermal printer 5 can output, and if the thermal printer 5 has a serial communication interface, for example, is data such as a signal (busy signal) requesting stopping control command output.

After applying necessary data processing to the stop-output data, the port handler 35 outputs through the first virtual port P1 to the print controller 31 (step SD9).

As a result of step SD9, the print controller 31 stops control command output until the user asserts a specific instruction or a specific operation (such as turning the power off and then on, or resetting) is performed. The process described above is possible because the print controller 31 can process status data that is compatible with the thermal printer 5.

The data interpreter/converter 36 also controls the host display unit 12 to display (report) information including at least the content of the error in the error report data on the display panel 16 (step SD10). For example, if the error report data is status data denoting a no-ink state, the data interpreter/converter 36 presents a message on the display panel 16 indicating that the inkjet printer 3 is out of ink. The information to be displayed is predetermined for the error report data, and is defined in the program or in data that can be referenced by the program.

Note that the method of reporting the content of the error is not limited to displaying on the display panel 16. For example, if there is an LED, the LED could be driven to turn on/off in a specific pattern, or a buzzer could be driven to report audibly.

The process of step SD10 enables the user to accurately know what error was reported in the error report data. More specifically, when an error that cannot occur in the old thermal printer 5 occurs in the new inkjet printer 3, this embodiment enables accurately reporting the error to the user without modifying the print controller 31 program.

However, if the status data is not error report data (step SD7 returns NO), the data interpreter/converter 36 controls the host display unit 12 to display on the display panel 16 information (report) including at least the content of the status indicated by the status data (step SD11). As a result, the user can accurately recognize the status reported in the status data. More specifically, when status data that is incompatible with the old thermal printer 5 but is compatible with the new inkjet printer 3 is sent from the inkjet printer 3, this embodiment enables accurately reporting the status to the user without modifying the print controller 31 program.

As described above, the host computer 2 (control device) according to this embodiment has a print controller 31 that can generate and output control commands compatible with a thermal printer 5 (second printing device), receive status data compatible with the thermal printer 5, and execute processes based on the input status data.

The host computer 2 also has a virtual second printer unit 32 that is configured to enable input of control commands output from the print controller 31, and outputs response data compatible with the thermal printer 5 to the print controller 31 when a control command is input.

The host computer 2 also has a data processor 33 that is configured to enable input of control commands output from the print controller 31, and when a control command is input from the print controller 31, converts the control command to a control command compatible with the inkjet printer 3 and outputs to the inkjet printer 3. The data processor 33 of the host computer 2 is also configured to enable input of status data from the connected inkjet printer 3, and when status data from the inkjet printer 3 is input, converts the input status data to data compatible with the thermal printer 5 based on structural differences between the thermal printer 5 and inkjet printer 3, and then outputs to the print controller 31.

Thus comprised, when the print controller 31 outputs a control command compatible with the thermal printer 5, an appropriate response is returned by a function of the virtual second printer unit 32, and there is no need to modify the print controller 31 program related to generating and outputting control commands.

There is therefore no need with this configuration to modify print controller 31 programs related to processing status data because when status data from the inkjet printer 3 is input, the data is appropriately converted and output to the print controller 31 by functions of the data processor 33. In other words, modification of the program rendering the functions of the print controller 31 so that a printer can be replaced can be reduced, and replacing a printer is therefore simple.

When status data is input from the inkjet printer 3, the data processor 33 in this embodiment determines if there is compatible status data, which is status data that reports the same content as the input status data and can be output by the thermal printer 5. If compatible status data is present, the data processor 33 converts the input status data to the compatible status data and outputs to the print controller 31.

Thus comprised, the data processor 33 converts the input status data to compatible status data and outputs to the print controller 31 when status data is input from the inkjet printer 3 and compatible status data is found. As a result, the inkjet printer 3 status can be accurately reported to the print controller 31, and the print controller 31 can be caused to execute an appropriate process.

When the result of deciding if compatible status data is stored is that compatible status data is not stored, and the input status data is error report data reporting an error that requires stopping outputting control commands from the print controller 31, the data processor 33 in this embodiment outputs data to stop outputting control commands and reports the content of the error to the print controller 31.

Thus comprised, output of control commands can be stopped, and the content of the error can be appropriately reported to the user when an error that requires the print controller 31 to stop outputting control commands occurs, even when there is no compatible status data corresponding to the status data input from the inkjet printer 3.

When the result of determining if compatible status data is present is that compatible status data is not present, and the input status data is not error report data, the data processor 33 in this embodiment reports the content of the status indicated by the input status data.

This configuration enables informing the user of the status denoted by the status data and prompting execution of an appropriate operation even when there is no compatible status data corresponding to the status data input from the inkjet printer 3.

Embodiment 2

A second embodiment of the invention is described next.

The data processor 33 in this second embodiment of the invention also has an automatic status back (ASB) compatibility function.

This ASB compatibility function is described below.

When there is a change in the status of the old thermal printer 5, the thermal printer 5 is configured to send status flag data reporting the change in status.

Figure 5:
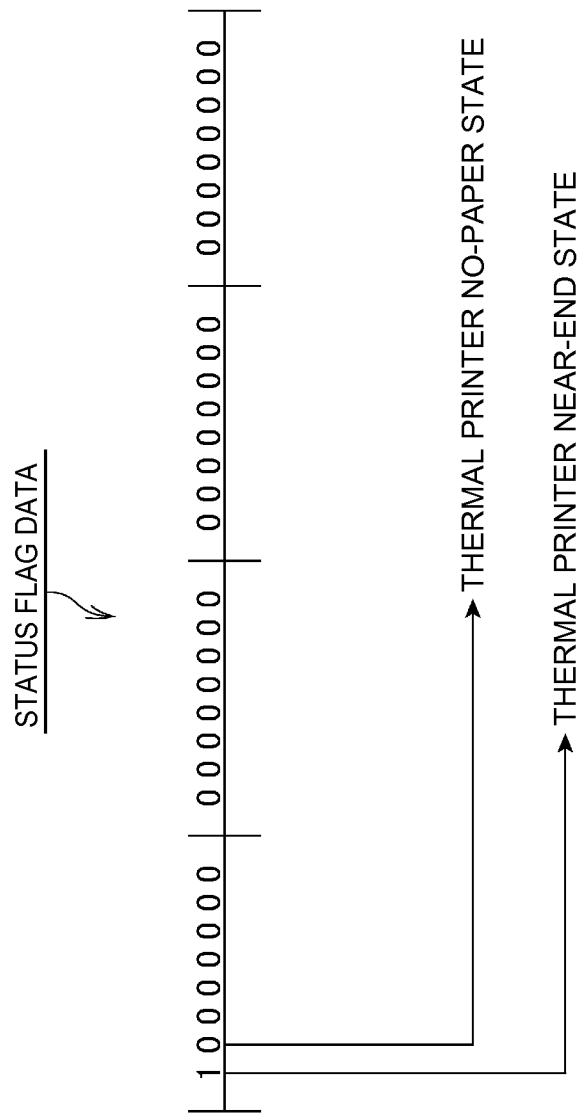
FIG. 5 illustrates the format of the status flag data.

FIG. 5 shows the format of the status flag data.

As shown in FIG. 5, the status flag data is four bytes long. Each bit in the status flag data functions as a flag representing a specific state. In the example shown in FIG. 5, bit 1 is the flag for the thermal printer near-end state, and bit 2 is the flag for the thermal printer no-paper state.

The thermal printer controller 25 of the thermal printer 5 monitors the status of the thermal printer 5, and when the thermal printer near-end state is detected, for example, generates and sends status flag data with the bit 1 flag set. When the status data is input to the print controller 31, the print controller 31 gets the exclusive OR of the last input status data and the newly input status data by a function of the thermal printer driver SPD, and recognizes the status from the state of the bit. The print controller 31 has a function that holds the input status data, and a function that recognizes the status by calculating the exclusive OR described above. More specifically, the print controller 31 can execute a process based on the status flag data, which is status data for the thermal printer 5.

Figure 6:
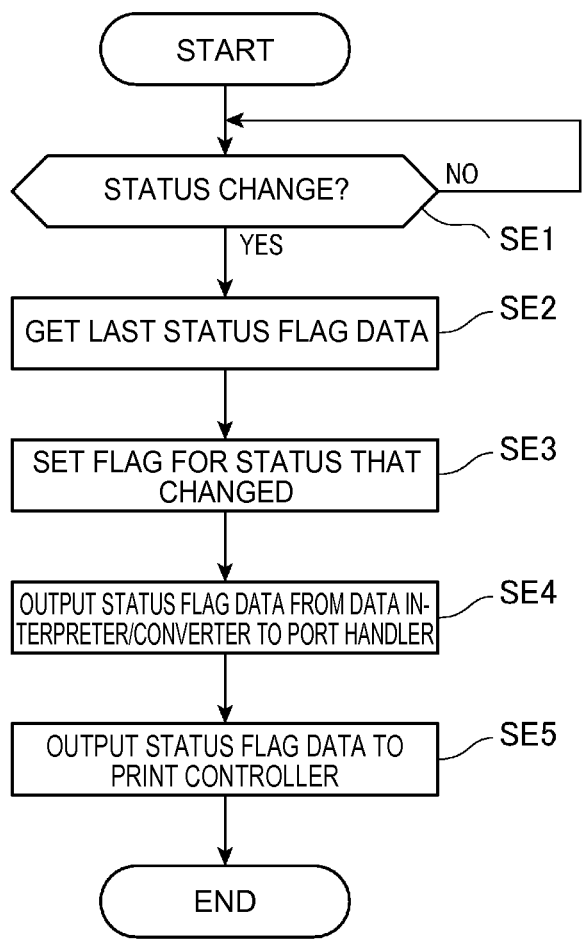
FIG. 6 is a flow chart showing the operation of the host computer.

FIG. 6 is a flow chart describing the operation of the ASB compatibility function of the host computer 2.

Referring to FIG. 6, when the inkjet printer 3 is connected, the data interpreter/converter 36 monitors change in printer status based on status data input from the printer (step SE1). For example, the data interpreter/converter 36 requests the status, and based on the response data (in this event, this data is equivalent to status data), checks if there was a change in status. The inkjet printer 3 is also configured to automatically output data indicating the status change (in this event, this data is equivalent to status data) when there is a status change in the inkjet printer 3, and the data interpreter/converter 36 looks for a change in status based on the data from the inkjet printer 3.

If there is a change in a status (step SE1 returns YES), the data interpreter/converter 36 gets the last status flag data output to the print controller 31 (step SE2). As described above, the print controller 31 stores the last input status flag data, and executes a specific process based on the result of comparing the status flag data when new status flag data is input.

Step SE2 operates as follows. For example, when the status flag data to the print controller 31 is output by only the data interpreter/converter 36, the data interpreter/converter 36 stores the status flag data that it (the data interpreter/converter 36) outputs, and in step SE2 gets the status flag data that was stored. When status flag data is also output by the virtual second printer unit 32, the data interpreter/converter 36 stores the newer of the status flag data output by the data interpreter/converter 36 and the status flag data output by the virtual second printer unit 32, and in step SE2 gets the stored status flag data. A configuration that queries the print controller 31 for the status flag data is also conceivable. In this event, the program must also already have a function for responding to such queries in order to avoid modifying the print controller 31 program.

Next, the data interpreter/converter 36 sets the flag (changes the value of the corresponding bit from 0 to 1) for the status that changed in the acquired status flag data (step SE3).

Next, the data interpreter/converter 36 outputs the status flag data set in step SE3 and information setting the first virtual port P1 as the output port to the port handler 35 (step SE4). The port handler 35 outputs the status flag data through the first virtual port P1 to the print controller 31 (step SE5).

As described above, the print controller 31 recognizes the inkjet printer 3 status that changed based on the bit value obtained as the exclusive OR of the newly input status data and the last status data that was input and stored.

As described above, the data interpreter/converter 36 of the data processor 33 in this embodiment monitors if there was a change in status based on the status data input from the connected inkjet printer 3, and when there is a status change, sets the flag for the status that changed in the status flag data and outputs to the print controller 31.

Thus comprised, the print controller 31 can be appropriately informed using the status flag data when there is a status change in the inkjet printer 3.

The invention is described above with reference to a preferred embodiment thereof, but the invention is not limited thereto and can be modified and adapted in many ways without departing from the scope of the accompanying claims.

The foregoing embodiments use a thermal printer and an inkjet printer as examples of printers with different configurations (structures), but printers with different configurations are not limited to these printer types. More specifically, the invention can be generally applied whenever a printer connected to a control device is changed from one printer to another printer that reports a different type of status data due to the differences in the configuration of each printer.

The function blocks shown in FIG. 1 and FIG. 2 can be desirably achieved by the cooperation of hardware and software, and do not suggest a specific hardware configuration. Functions of the host computer 2 can also be handled by separate devices externally connected to the host computer 2. The host computer 2 can also perform the operations of different functions by running a program stored on an externally connected storage medium. The storage medium could, for example, be a hard disk drive, optical disc, magneto-optical disc, or flash memory.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A control device connected to a first printing device comprising:
   a print controller that can generate and output a control command compatible with a second printing device that differs structurally from the first printing device, and execute a process based on status data for the second printing device;
   a virtual second printing device that outputs response data for the second printing device to the print controller when a control command output from the print controller is input;
   a data processing unit that when a control command output from the print controller is input to the data processing unit, converts the input control command to a control command compatible with the first printing device and outputs to the first printing device, and when status data from the connected first printing device is input to the data processing unit, converts the status data to data compatible with the second printing device based on the structural differences between the first printing device and the second printing device, and outputs to the print controller;
   a first virtual port that allows data to be transferred between the print controller and the data processing unit; and
   a second virtual port that allows data to be transferred between the virtual second printer and the data processing unit;
   wherein when status data is input from the first printing device, the data processing unit determines if there is compatible status data, which is status data for the second printing device with content of the same identity as the input status data, if there is compatible status data, converts the input status data to compatible status data and outputs the compatible status data to the print controller, and, if there is no compatible status data, display an error message on a display included in a user interface of the control device.

2. The control device described in claim 1, wherein:
   when the result of determining if compatible status data is present is that there is no compatible status data, and the input status data is error report data indicating an error occurred that requires stopping control command output by the print controller, the data processing unit outputs to the print controller data stopping control command output, and reports the error content.

3. The control device described in claim 2, wherein:
   when the result of determining if there is compatible status data is that there is no compatible status data, and the input status data is not error report data, the data processing unit reports the content of the status indicated by the input status data.

4. The control device described in claim 1, wherein:
   the print controller can execute a process based on status flag data, which status compatible with the second printing device and represents a status by a flag state; and
   the data processing unit monitors if there was a change in a status of the first printing device based on the status data input from the connected first printing device, and when there is a status change, outputs status flag data with the flag for the status that changed set to the print controller.

5. A control method of a control device connected to a first printing device, the control method controlling a control device including a print controller that can generate and output a control command compatible with a second printing device that differs structurally from the first printing device, and execute a process based on status data for the second printing device, and a virtual second printing device that outputs response data for the second printing device to the print controller when a control command output from the print controller is input, and the control method comprising:
   a data processing step that converts the input control command to a control command compatible with the first printing device and outputs to the first printing device when a control command output from the print controller is input, and when status data from the connected first printing device is input, converts the status data to data compatible with the second printing device based on the structural differences between the first printing device and the second printing device, and outputs to the print controller;

wherein when status data is input from the first printing device, the data processing step determines if there is compatible status data, which is status data for the second printing device with content of the same identity as the input status data, if there is compatible status data, converts the input status data to compatible status data and outputs the compatible status data to the print controller, and, if there is no compatible status data, display an error message on a display included in a user interface of the control device.

6. The control method of a control device described in claim 5, wherein:

when the result of determining if compatible status data is present is that there is no compatible status data, and the input status data error report data indicating an error occurred that requires stopping control command output by the print controller, the data processing step outputs to the print controller data stopping control command output, and reports the error content.

7. The control method of a control device described in claim 6, wherein:

when the result of determining if there is compatible status data is that there is no compatible status data, and the input status data is not error report data, the data processing step reports the content of the status indicated by the input status data.

8. The control method of a control device described in claim 5, wherein:

the data processing step monitors if there was a change in a status of the first printing device based on the status data input from the connected first printing device, and when there is a status change, outputs to the print controller status flag data that is compatible with the second printing device and has the flag for the status that changed set.

* * * * *